United States Patent
Brundage et al.

(10) Patent No.: US 8,949,677 B1
(45) Date of Patent: Feb. 3, 2015

(54) DETECTING ANOMALIES IN TIME SERIES DATA

(75) Inventors: Michael L. Brundage, Kirkland, WA (US); Brent Robert Mills, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 300 days.

(21) Appl. No.: 13/478,531

(22) Filed: May 23, 2012

(51) Int. Cl.
 *G06F 11/00* (2006.01)

(52) U.S. Cl.
 USPC .......................................................... 714/48

(58) Field of Classification Search
 CPC ............ G06F 11/0793; G06F 11/0709; G06F 11/0772; G06F 11/0781
 USPC .......................................................... 714/48
 See application file for complete search history.

(56) References Cited

U.S. PATENT DOCUMENTS

| | | | | |
|---|---|---|---|---|
| 5,846,189 A | * | 12/1998 | Pincus | 600/301 |
| 7,590,589 B2 | * | 9/2009 | Hoffberg | 705/37 |
| 2001/0022558 A1 | * | 9/2001 | Karr et al. | 342/450 |
| 2003/0060692 A1 | * | 3/2003 | L. Ruchti et al. | 600/310 |
| 2009/0234899 A1 | * | 9/2009 | Kramer | 708/200 |
| 2012/0271587 A1 | * | 10/2012 | Shibuya et al. | 702/127 |
| 2013/0089341 A1 | * | 4/2013 | Roberts et al. | 398/208 |
| 2013/0089342 A1 | * | 4/2013 | Oveis Gharan et al. | 398/208 |

OTHER PUBLICATIONS

Way back machine for wikipedia time series page, retrieved on May 12, 2014 from https://web.archive.org/web/20120505220341/http://en.wikipedia.org/wiki/Time_series.*

* cited by examiner

*Primary Examiner* — Yair Leibovich
(74) *Attorney, Agent, or Firm* — Thomas | Horstemeyer, LLP

(57) ABSTRACT

Disclosed are various embodiments for detecting anomalies in time series data. At least one anomaly is detected in a time series that is derived from a corresponding metric observed from a computing system. The time series is non-stationary time series or heteroskedastic. The detected anomaly is correlated with at least one of a plurality of external events affecting the computing system. A magnitude is assigned to the detected anomaly. The detected one anomaly, the assigned magnitude, and the correlated at least one external event are reported to a client device.

28 Claims, 5 Drawing Sheets

DETECTING ANOMALIES IN TIME SERIES DATA

BACKGROUND

Many computing system generate metrics during system operation. Such metrics may describe various aspects of the system such as system performance and errors encountered by the system. Such metrics may be collected and analyzed to better understand the behavior of the system.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to processing of time series data, and more specifically, to automated and unsupervised detection of anomalies within time series data. Various anomaly detection embodiments described herein can automatically monitor large numbers of distinct time series at different time resolutions (e.g., minutes, hours, days, weeks, etc.) and detect anomalies therein. Various embodiments described herein can detect anomalies in time series that are non-stationary, non-ergodic, heteroskedastic, and/or contain cyclical or seasonal effects. Various types of anomalies can be detected, such as slopes, step functions (i.e., discontinuities), spikes (e.g., V shapes), combinations of spikes and step functions (e.g., V shapes in which the trailing edge of the V has a step function relative to the leading edge of the V), and shaking (e.g., transitions between low variance and high variance).

Some of the anomaly detection embodiments described herein detect anomalies that are within variance, yet statistically significant. An example of such an anomaly is a small but persistent 20 ms step function in a metric with 50 ms of standard deviation.

In some of the embodiments described herein, multiple co-occurring anomalies are grouped together as "quakes." The term "quake" alludes to seismologic time series, in which physically separated seismographs record individual tremors at different locations that are then combined and reported as a single earthquake.

The examples discussed herein relate to metrics generated during operating of a computing system or environment. However, the anomaly detection techniques disclosed herein also apply to time series that represent other types of data. In the following discussion, a general description of the system and its components is provided, followed by a discussion of the operation of the same.

Figure 1:
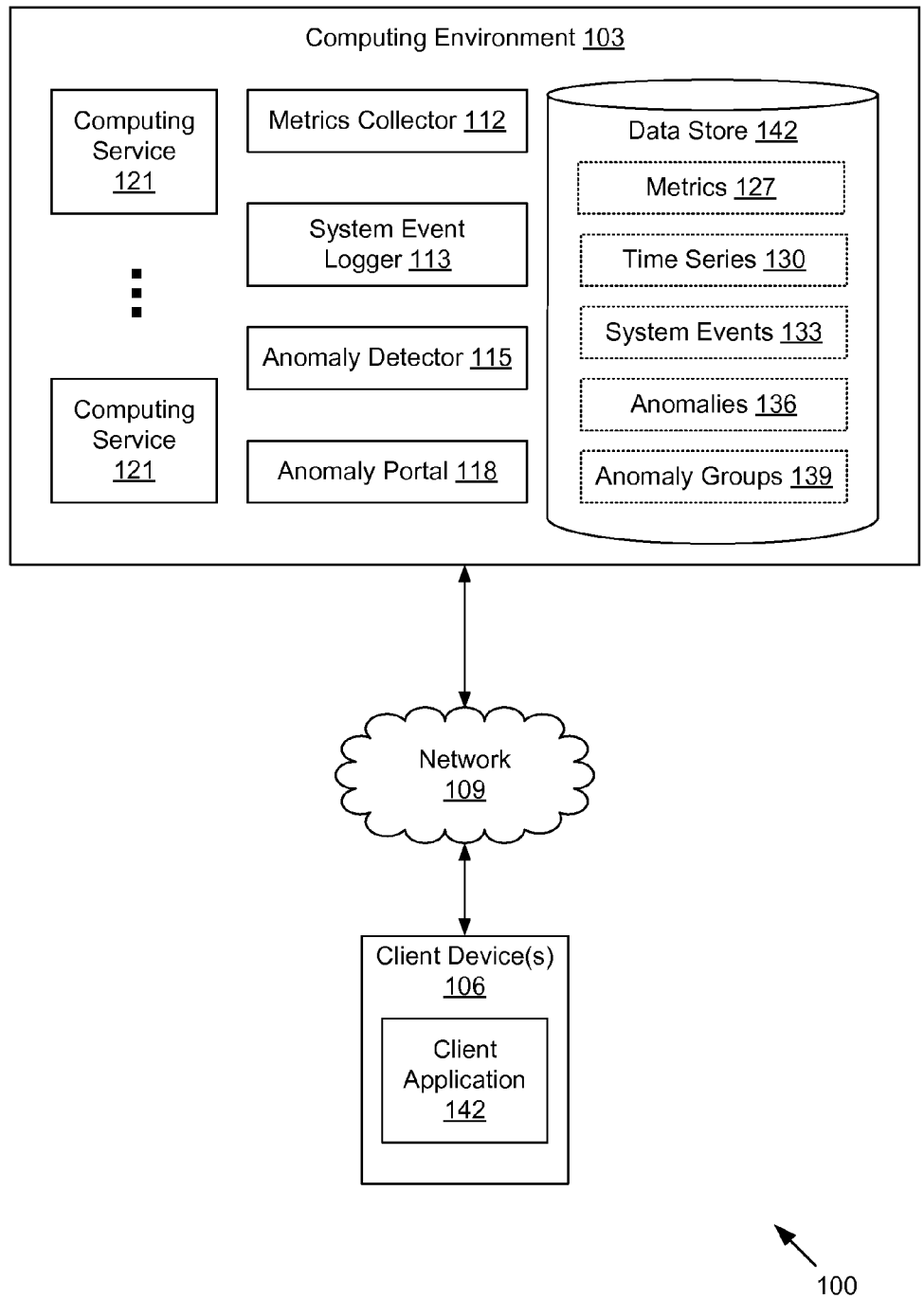
FIG. 1 is a drawing of a networked environment according to one embodiment of the present disclosure.

With reference to FIG. 1, shown is a networked environment 100 according to various embodiments. The networked environment 100 includes a computing environment 103 and one or more client devices 106, in data communication by way of a network 109. The network 109 includes, for example, the Internet, intranets, extranets, wide area networks (WANs), local area networks (LANs), wired networks, wireless networks, or other suitable networks, or any combination of two or more such networks.

The computing environment 103 may comprise, for example, a server computer or any other system providing computing capacity. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations.

The computing environment 103 may be operated by a hosting provider to host network sites for various entities, or may be controlled and managed by a provider entity that provides access to resources of the computing environment 103 to entities for a fee under a utility computing model. For example, entities may arrange for access to applications executing in the computing environment 103, for storage in the computing environment 103, or for messaging between components in the computing environment 103. Such a system is sometimes referred to as "cloud computing system," but the term "cloud computing" is not intended to be limiting.

The computing environment 103 may utilize differing hardware platforms and may have differing hardware configurations of resources, for example, of central processing units (CPUs) that provide general-purpose processing resources, graphics processing units (GPUs) that provide graphics processing resources, system memory, data storage characteristics such as capacity, storage bandwidth, and storage input/output operations per second (IOPS), network bandwidth, and/or other hardware characteristics. The computing environment 103 may be executing instances of virtual machines used to provide general computing capability to entities. Such entities may be capable of terminating machine instances or launching machine instances whenever they desire, thereby providing an elastic computing resource.

Various applications and/or other functionality may be executed in the computing environment 103 according to various embodiments. The components executed on the computing environment 103 include, for example, a metrics collector 112, a system event logger 113, an anomaly detector 115, an anomaly portal 118, computing services 121, and other applications, services, processes, systems, engines, or functionality not discussed in detail herein. Various data is stored in a data store 124 that is accessible to the computing environment 103. The data store 124 may be representative of a plurality of data stores as can be appreciated. The data stored in the data store 124, for example, is associated with the operation of the various applications and/or functional entities of the computing environment 103 as described herein. The data stored in the data store 124 includes, for example, metrics 127, time series 130, system events 133, anomalies 136, anomaly groups 139, and potentially other data.

A computing service 121 is executed to provide a particular functionality to the computing environment 103 as a whole, and in doing so, may export one or more functions through a programmatic interface. A computing service 121 may be implemented, for example, as a web service. Various computing services 121 may (singly or in combination) implement features such as a network storage service, a cloud computing service, a search service, an advertising service, a network page server, an electronic commerce marketplace, or components thereof.

In providing their respective functions, the various computing services 121 may generate one or more metrics 127. For example, a network page server may track metrics 127 such as latency in generating network pages, the number of pages generated in a time period, the number of customers requesting a particular network page, etc. As another example, a network storage service may track metrics 127 such as the latency in fulfilling a storage request, the number of customers creating a storage object, etc. As yet another example, a search service may track metrics 127 such as the latency in fulfilling a search query, the number of search queries fulfilled in a particular time period, etc.

The system event logger 113 is executed to record system events 133 associated with the computing environment 103. Examples of such system events 133 include installation or deployment of new computing services 121 in the computing environment 103, updates to existing computing services 121 in the computing environment 103, diagnostics tests running in the computing environment 103, changes to the hardware configuration of the computing environment 103, and/or changes to the configuration of the network 109.

The metrics collector 112 is executed to collect the various metrics 127 produced by the computing services 121 and to store the metrics 127 in the data store 124. The metrics collector 112 may also aggregate the collected metrics 127 in various ways. For example, the metrics collector 112 may aggregate all instances of a metric 127 from a particular computing service 121 (e.g., the search service) that reside in a particular data center, that reside in a particular geographic region, etc.

Each particular metric 127 has a particular value at a particular time, and these metric values may be collected into a time series 130 for the metric 127. That is, latency metrics 127 produced by the network page server may be gathered into a network page latency time series 130, which can be viewed as a series of {time, value} pairs. Each time series 130 has a particular resolution or periodicity, e.g., hourly, daily, weekly, monthly, quarterly, etc.

The anomaly detector 115 is executed to detect anomalies in one or more of these time series 130. The functionality of the anomaly detector 115 will described in further detail below, but a brief description will now be provided. In summary, the anomaly detector 115 processes the time series 130 to identify unexpected changes in the time series 130 and designate these occurrences as anomalies 136. A representative non-limiting list of anomalies 136 includes unexpected changes in the mean of a time series 130, unexpected changes in the variance of a time series 130, outlier values of a time series 130, and missing and/or unexpectedly appearing data in a time series 130. The anomaly detector 115 may assign a magnitude or score to the detected anomaly 136.

The anomaly detector 115 may further determine whether any other anomalies 136 are present in the same time series 130 or a different time series 130, and if so designate the co-occurring anomalies 136 as a co-occurring anomaly group 139. The anomaly detector 115 may further determine whether one or more system events 133 occur during the same time period as the detected anomalies 136.

The anomaly detector 115 may store a description of the anomalies 136 in the data store 124. Such a description may include, for example, the anomaly type, the time series 130 in which the anomaly 136 was detected, the time at which the anomaly 136 occurred, and the existence and/or identity of a co-occurring anomaly group 139.

The anomaly portal 118 is executed to provide information about detected anomalies 136 to client devices 106. In some embodiments, the anomaly portal 118 is integrated with the anomaly detector 115. In some embodiments, the anomaly portal 118 is integrated into a comprehensive analytics tool that also provides other types of analytics data to developers of the computing environment 103.

Having discussed the computing environment 103, the client device 106 will now be considered. The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a smart phone, a set-top box, a television, a music player, a video player, a media player, a web pad, a tablet computer system, a game console, an electronic book reader, or other devices with like capability. The client device 106 may be configured to execute various applications such as a client application 142. The client device 106 may be configured to execute applications beyond the client application 142 such as, for example, email applications, messaging applications, and/or other applications.

The client application 142 may be executed in the client device 106, for example, to receive information about detected anomalies 136 from the anomaly detector 115. Examples of such information include the anomaly type, the magnitude, the time series 130, any co-occurring anomaly groups 139, any co-occurring system events 133, and so on. The client application 142 may then render information about the detected anomalies 136 as provided by the anomaly detector 115 for display to a user. The display may be graphical in nature. The client application 142 may also be executed to query the anomaly detector 115 for particular reports, for example, a list of all anomalies 136 detected within a time period, a list of anomalies 136 associated with particular metrics 127, a list of anomalies 136 associated with particular computing services 121, etc. The client application 142 may be execute in the context of a browser (not shown), or may be implemented as a standalone application.

Next, a general description of the operation of the various components of the computing environment 103 is provided. To begin, the various computing services 121 execute and, in doing so, generate metrics 127. These metrics 127 are periodically collected by the metrics collector 112 and stored in the data store 124. The metrics 127 are processed to generate a time series 130 for each metric 127. The anomaly detector 115 processes one or more of the time series 130 to detect anomalies 136 within the time series 130 and to assign a magnitude to each anomaly 136. Some embodiments of the anomaly detector 115 may perform additional processing, for example, to identify groups of co-occurring anomalies 136 as well as system events 133 that co-occur with identified anomalies 136. Information about the detected anomalies 136, anomaly groups 139, and system events 133 is stored in the data store 124.

A user of the client device 106 obtains information about anomalies 136 in the computing environment 103 by interacting with the client application 142. The client application 142 generates a request for anomaly information which is serviced by the anomaly portal 118. The client application 142 may then display information about the detected anomalies 136, anomaly groups 139, and/or system events 133, for example, in a graphical format.

Figure 2:
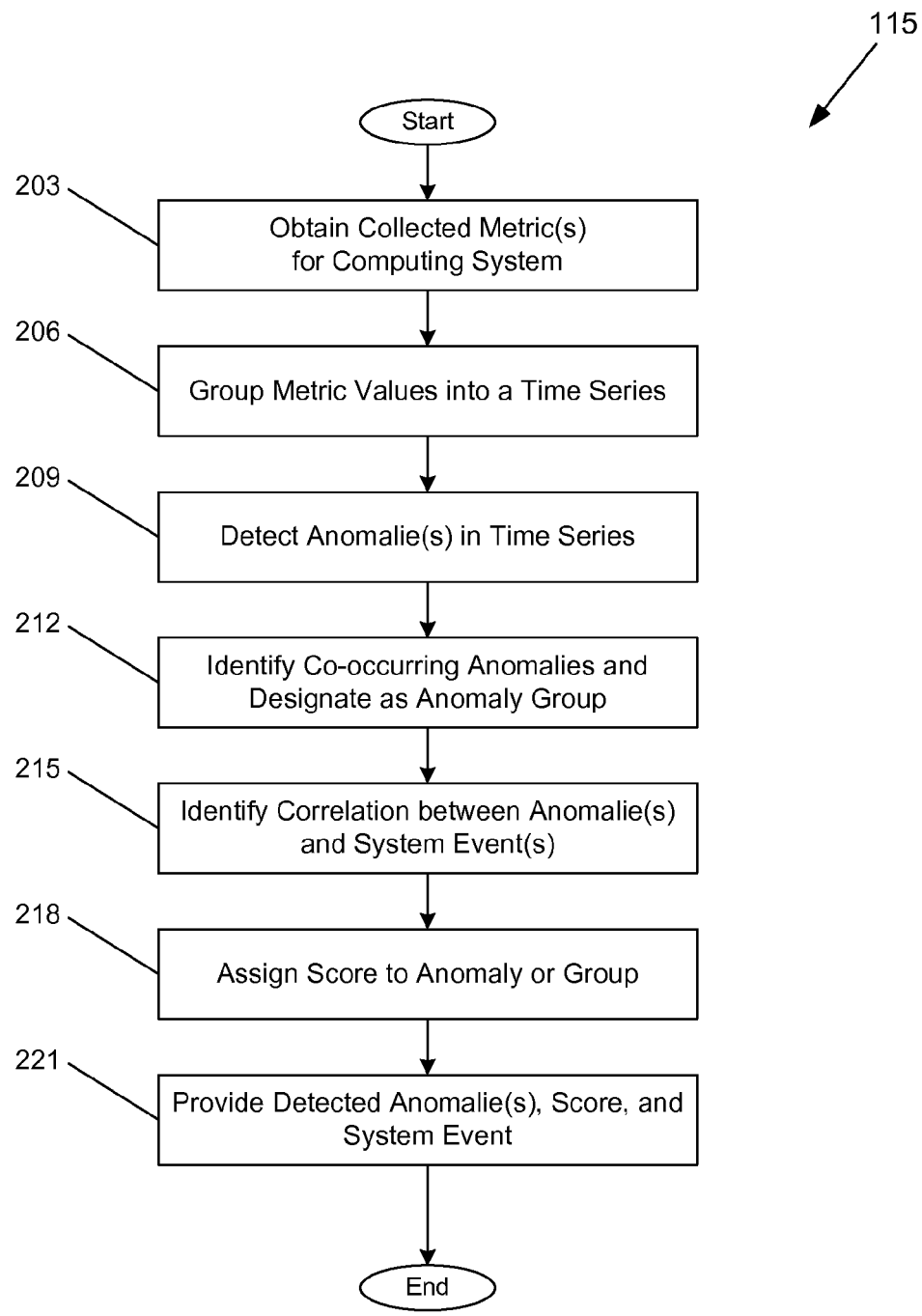
FIG. 2 is a flowchart illustrating an example of functionality implemented as portions of an anomaly detector executed in a computing device in the networked environment of FIG. 1 according to various embodiments of the present disclosure.

Moving on to FIG. 2, shown is a flowchart that provides one example of the operation of portion(s) of the anomaly detector 115 according to various embodiments. It is understood that the flowchart of FIG. 2 provides merely an example of the many different types of functional arrangements that may be employed to implement the operation of portion(s) of the anomaly detector 115 as described herein. As an alternative, the flowchart of FIG. 2 may be viewed as depicting an example of steps of a method implemented in the computing environment 103 (FIG. 1) according to one or more embodiments.

Beginning at box 203, the anomaly detector 115 obtains one or more metrics 127 associated with the computing environment 103. As explained above, these metrics 127 are generated by the various computing services 121 during the operation of the computing environment 103 and are stored in the data store 124. In some embodiments, the metrics 127 are periodically collected by the metrics collector 112, and the anomaly detector 115 requests the collected metrics 127 from the metrics collector 112. In other embodiments, the anomaly detector 115 retrieves the metrics 127 from the data store 124.

Next, at box 206, the anomaly detector 115 processes collected values for each metric 127 to produce a time series 130 for each metric 127. For example, if at box 203 the anomaly detector 115 obtains values for a search query latency metric 127 and a page load frequency metric 127, then at box 206 the anomaly detector 115 generates a search query latency time series 130 and a page load frequency time series 130. The time series 130 may be generated by, for example, adding to the series 130 each particular value of the metric 127, along with a timestamp stored with the value. In some embodiments, the metrics 127 may already be grouped in a time series, in which case the processing at box 206 may be omitted.

At box 209, the anomaly detector 115 looks for one or more anomalies 136 in the one or more time series 130 generated at box 206. This anomaly detection process will be discussed in further detail in connection with FIG. 3, but it should be noted that the process may include classifying identified anomalies 136 into anomaly types as well as determining a time at which each anomaly 136 occurred within the time series 130.

Next, at box 212, the anomaly detector 115 examines any anomalies 136 detected at box 209 to identify any of the anomalies 136 that occur at the same time or in the same time period. To do so, the anomaly detector 115 may partition the time series 130 into various groups or buckets according to the time of occurrence of the anomaly 136. The duration of this co-occurrence time period may be predefined, for example, through the anomaly portal 118. The co-occurring anomalies 136 may be designated as a co-occurring anomaly group 139, which may be referred to herein as a "quake."

Next, at box 215, the anomaly detector 115 looks for a correlation between the detected anomalies 136 and one or more system events 133 stored in the data store 124. To do so, the anomaly detector 115 may examine timestamps for the detected anomalies 136 or the anomaly groups 139, along with timestamps for the system events 133, and look for system events 133 that overlap in time with a detected anomaly 136 or with a co-occurring anomaly group 139. The system events 133 may include, for example, changes to the computing services 121 that execute in the computing environment 103, changes to the configuration of the computing environment 103, and/or changes to the network 109.

At box 218, the anomaly detector 115 assigns a magnitude or score to the detected anomaly, or to the group of co-occurring anomalies 136. Various factors may be used to compute this score as should be appreciated. A non-limiting list of such factors includes a measure of significance or importance of the metric 127 from which the anomaly 136 was derived, the number of time series 130 involved in the anomaly 136, and the magnitudes of the individual anomaly 136 in a group of co-occurring anomalies 136.

Next, at box 221, the anomaly detector 115 reports the detected anomalies 136, the assigned magnitude, and any correlated external events. For example, the anomaly detector 115 may provide this information through the anomaly portal 118. The anomaly detector 115 may encode this information for display to a client device 106, or may provide the information to the anomaly portal 118 for such encoding. The process of FIG. 2 is then complete.

In the embodiment described above in connection with FIG. 2, the anomaly detector 115 assigns scores to individual anomalies 136 during the same process that assigns a magnitude to co-occurring anomaly groups 139. In other embodiments, the anomaly detector 115 assigns scores to individual anomalies 136 as those anomalies 136 are detected at box 209.

In the embodiment described above in connection with FIG. 2, the anomaly detector 115 processes all the collected metrics 127 in order to identify anomalies 136. In other embodiments, only a subset of the collected metrics 127 is processed at box 206, where the subset is configurable through the anomaly portal 118. In still other embodiments, anomalies 136 are identified in the all the collected metrics 127, but the processing is staggered rather than being performed all at once.

Figure 3:
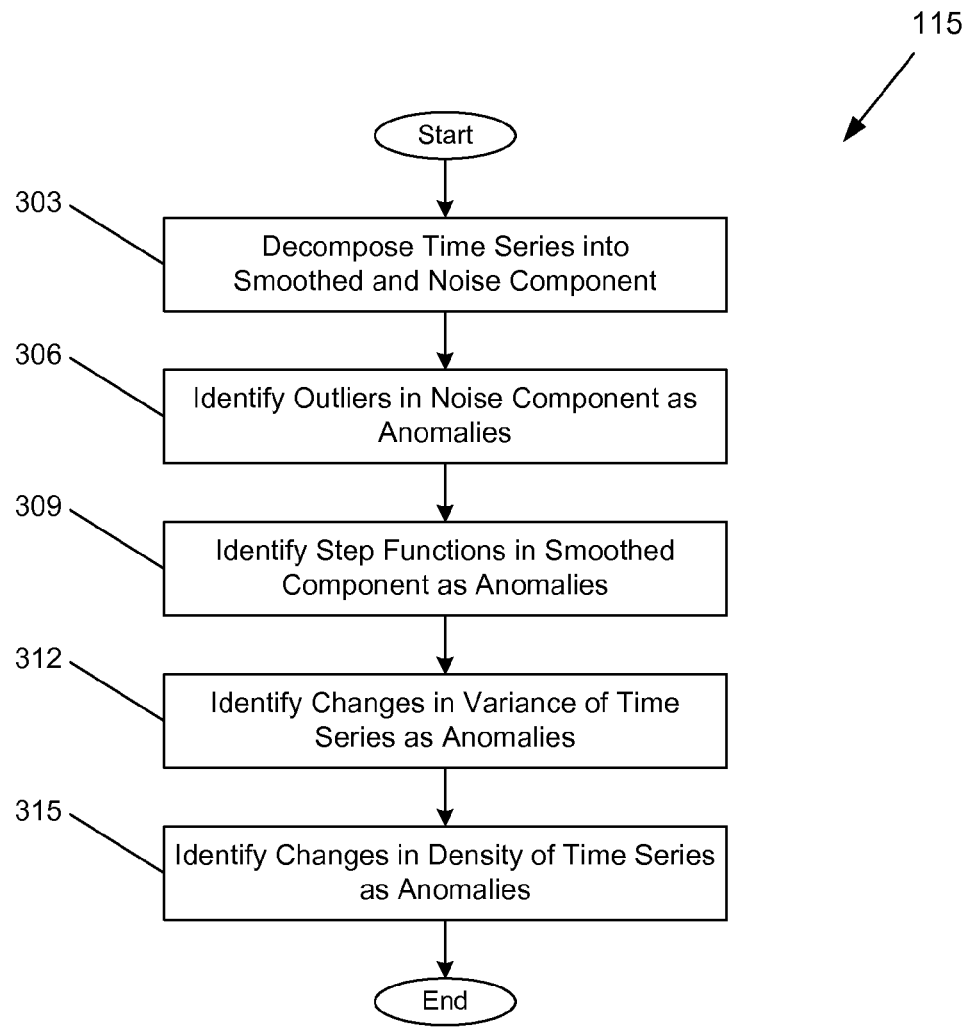
FIG. 3 is a flowchart illustrating another example of functionality implemented as portions of an anomaly detector executed in a computing device in the networked environment of FIG. 1 according to various embodiments of the present disclosure.

Turning now to FIG. 3, shown is a flowchart that another example of the operation of portion(s) of the anomaly detector 115 according to various embodiments. Specifically, the flowchart of FIG. 3 provides further details of the operation of box 209 from FIG. 2, which detects anomalies 136 in one or more time series 130. Although the process of FIG. 3 is described in terms of operations on a particular time series 130, some embodiments apply the operation of FIG. 3 to each time series 130. It is understood that the flowchart of FIG. 3 provides merely an example of the many different types of functional arrangements that may be employed to implement the operation of portion(s) of the anomaly detector 115 as described herein. As an alternative, the flowchart of FIG. 3 may be viewed as depicting an example of steps of a method implemented in the anomaly detector 115 (FIG. 1) according to one or more embodiments.

Beginning at box 303, the anomaly detector 115 decomposes the time series 130 into a smoothed component and a noise component. To this end, the anomaly detector 115 may compute a moving median of the time series 130 to filter out the noise component, leaving the smoothed component. The window size for the moving median is based on the sample rate of the time series 130. Various techniques may be used to handle edges and missing values in the time series 130 as may be appreciated. In some embodiments, a wavelet filter is applied to the computed medians.

The point wise sum of the two components produced at box 303 is the original time series 130. Thus, the noise component can be viewed as the point wise difference between the time series 130 and the smoothed component. Conversely, the smoothed component can be viewed as the point wise difference between the original time series 130 and the noise component.

Next, at box 306, the anomaly detector 115 examines the noise component extracted at box 303 to identify any outliers present in the component, using a moving window with a predefined window size. To this end, the anomaly detector 115 may compute a central value and a moving interquartile range (mIQR) of the noise component. Data points that are more than a predefined multiple of the mIQR distance from the mean may be designated as anomalies 136, and more specifically, as spike anomalies 136. In one embodiment, the predefined multiple is three. Using an interquartile range as the moving window has the advantage of moving with the variance over time while not being too sensitive to outlier effects. In some embodiments, symmetric quartiles are used (e.g., 25th and 75th percentiles, 10th and 90th percentiles, etc.), while asymmetric quartiles are used in other embodiments. Various types of central values may be used, including but not limited to the mean and the median.

At box 309, the anomaly detector 115 examines the smoothed component extracted at box 303 to identify any step functions present in in the component. In some embodiments, a step function corresponds to a change in the mean of the smoothed component. The step function detection process will be discussed in further detail in connection with FIG. 4.

Next, at box 312, the anomaly detector 115 examines the time series 130 to identify any changes in the variance of the time series 130. To this end, the anomaly detector 115 may compute the moving variance in the time series 130 and designate, as an anomaly 136, a change in variance above a predefined threshold. More specifically, such an anomaly 136 may be designated as a variance anomaly 136. In some embodiments, the anomaly detector 115 may compute the moving variance of the smooth component extracted at box 303. In other embodiments, the anomaly detector 115 may compute the moving variance for the original time series 130.

At box 315, the anomaly detector 115 examines the time series 130 to identify any changes in density in the values of the time series 130. Such changes in density may represent data points missing from the time series 130 or data points present in the time series 130 that were not previously present. A change in density above a predefined threshold is then designated as an anomaly 136, and more specifically, as a density change anomaly 136. In some embodiments, the anomaly detector 115 may compute the moving density of the original time series 130. In other embodiments, the anomaly detector 115 may separately compute moving densities for the noise component and smooth component extracted at box 303. The process of FIG. 3 is complete.

Figure 4:
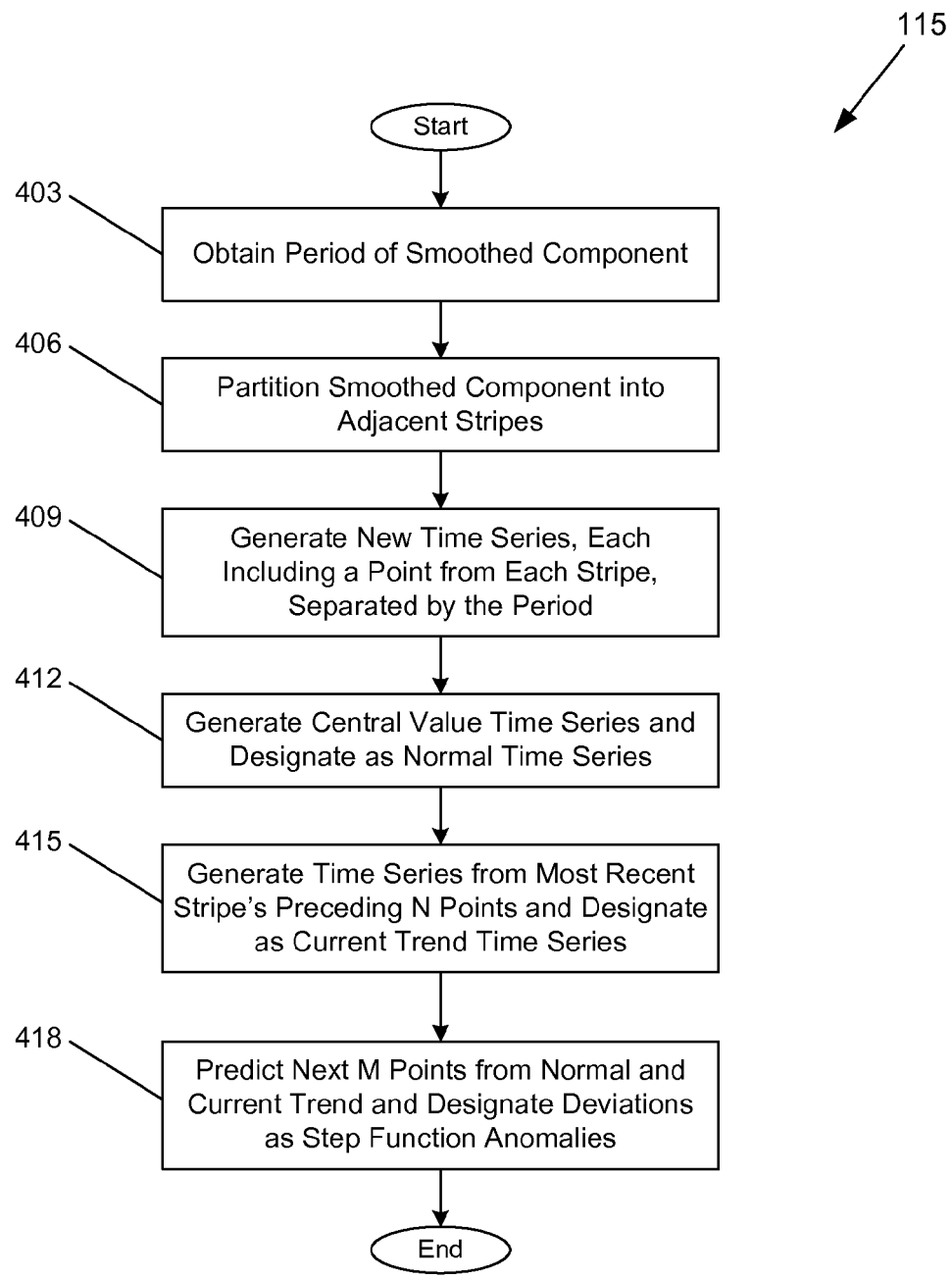
FIG. 4 is a flowchart illustrating yet another example of functionality implemented as portions of an anomaly detector executed in a computing device in the networked environment of FIG. 1 according to various embodiments of the present disclosure.

With reference now to FIG. 4, shown is a flowchart that another example of the operation of portion(s) of the anomaly detector 115 according to various embodiments. Specifically, the flowchart of FIG. 4 provides further details of the operation of box 309 from FIG. 3, which detects step functions in a smoothed component of a time series 130. Although the process of FIG. 4 is described in terms of operations on a particular time series 130, some embodiments apply the operation of FIG. 4 to each time series 130. It is understood that the flowchart of FIG. 4 provides merely an example of the many different types of functional arrangements that may be employed to implement the operation of portion(s) of the anomaly detector 115 as described herein. As an alternative, the flowchart of FIG. 4 may be viewed as depicting an example of steps of a method implemented in the anomaly detector 115 (FIG. 1) according to one or more embodiments.

Beginning at box 403, the anomaly detector 115 obtains the periodicity of the smoothed component of the time series 130. In some embodiments, the periodicity is known a priori and is retrieved from the data store 124. In other embodiments, the periodicity is computed by the anomaly detector 115 using a technique such as spectral analysis. A non-limiting list of example periods includes hourly, daily, weekly, monthly, quarterly, and yearly.

Next, at box 406, the anomaly detector 115 partitions the smoothed component into a set of adjacent "stripes," ending at the most recently collected time. Each stripe is one period in length or duration. In some embodiments, the anomaly detector 115 discards the oldest stripe if it does not contain data for an entire period.

At box 409, the anomaly detector 115 takes a corresponding point from each stripe, separated by the period, and creates N time series 130 from these points, where N is the periodicity obtained at box 403. For example, if the period is weekly, seven new time series 130 are created. The first generated time series 130 includes the Sunday data point from the oldest stripe, the Sunday data point from the second oldest stripe, and so on, finishing with the Sunday data point from the current stripe. Similarly, the seventh and last time series 130 generated at box 409 includes the Saturday data point from the oldest stripe and finishes with the Saturday data point from the current stripe.

Next, at box 412, the anomaly detector 115 computes a central value for each periodic time series 130 generated at box 409, producing a plurality of central values. A central value may include, but is not limited to, the mean, the median, or the exponentially weighted mean. The anomaly detector 115 creates another time series 130 that includes these central values. The anomaly detector 115 designates the central value time series 130 as the normal time series 130.

At box 415, the anomaly detector 115 processes the most recent stripe to generate another time series 130 that includes the preceding N points in the most recent stripe, where N is a predefined value between one and the period or stripe length. The anomaly detector 115 designates the preceding time series 130 as the current trend time series 130.

Next, at box 418, the anomaly detector 115 predicts the next M points in the smoothed component from the normal time series 130 generated at box 412 and the current trend time series 130 generated at box 415. The anomaly detector 115 identifies any points in the smoothed component that deviate significantly from the predicted M next points, and designates such deviant points as anomalies 136. More specifically, the anomaly detector 115 designates any points identified at box 418 as mean anomalies 136 or step function anomalies 136. The measure of significance used at box 418 can be configured, for example, through the anomaly portal 118. The process of FIG. 4 is complete.

Figure 5:
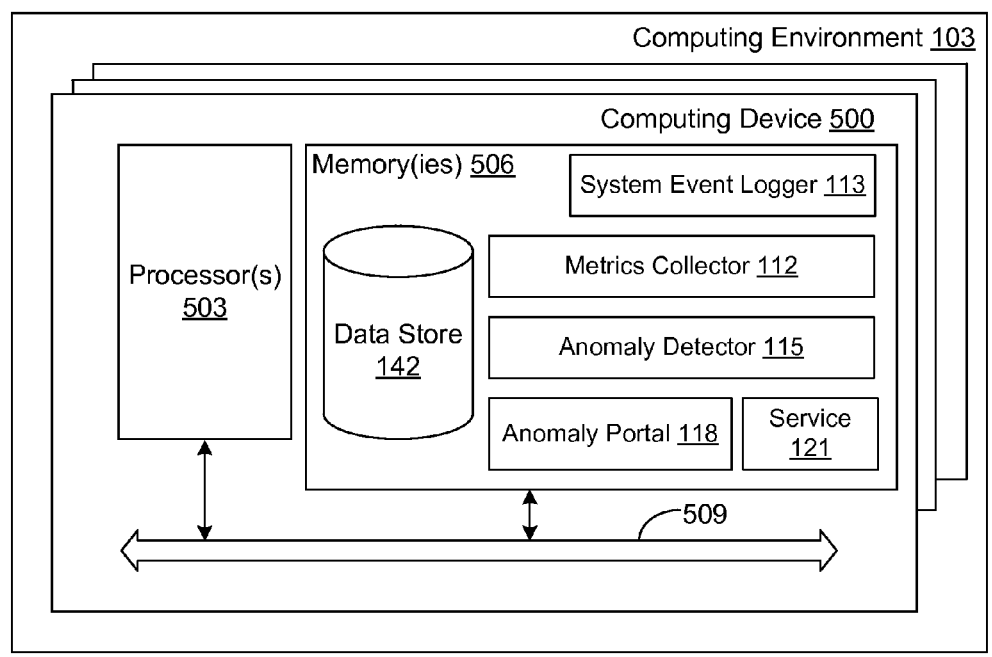
FIG. 5 is a schematic block diagram that provides one example illustration of a computing device employed in the networked environment of FIG. 1 according to various embodiments of the present disclosure.

Moving on to FIG. 5, shown is a schematic block diagram of a computing device 500 according to an embodiment of the present disclosure. The computing device 500 corresponds to a representative computing device which may be employed in the computing environment 103 (FIG. 1). The computing device 500 includes at least one processor circuit, for example, having a processor 503 and a memory 506, both of which are coupled to a local interface 509. To this end, the computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the metrics collector 112, the system event logger 113, the anomaly detector 115, the anomaly portal 118, computing services 121, and potentially other applications. In addition, an operating system may be stored in the memory 506 and executable by the processor 503. While not illustrated, the client device 106 (FIG. 1) also includes components like those shown in FIG. 5, whereby the client application 142 (FIG. 1) is stored in a memory and executable by a processor.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and executed by the processor 503, source code that may be expressed in proper format such as object code that is capable of being loaded into a random access portion of the memory 506 and executed by the processor 503, or source code that may be interpreted by another executable program to generate instructions in a random access portion of the memory 506 and executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network 109 (FIG. 1) that facilitates communication between any two of the multiple processors 503, between any of the processors 503 and any of the memories 506, or between any two of the memories 506, etc. The local interface 509 may comprise additional systems designed to coordinate this communication, including, for example, performing load balancing. The processor 503 may be of electrical or of some other available construction.

Although the metrics collector 112, the system event logger 113, the he anomaly detector 115, the anomaly portal 118, computing services 121 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2, 3, and 4 show the functionality and operation of an implementation of portions of the anomaly detector 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as one of the processors 503 in a computer system or other system. The machine code may be converted from the source code, etc. If embodied in hardware, each block may represent a circuit or a number of interconnected circuits to implement the specified logical function(s).

Although the flowcharts of FIGS. 2, 3, and 4 show a specific order of execution, it is understood that the order of execution may differ from that which is depicted. For example, the order of execution of two or more blocks may be scrambled relative to the order shown. Also, two or more blocks shown in succession in the flowcharts of FIGS. 2, 3, and 4 may be executed concurrently or with partial concurrence. Further, in some embodiments, one or more of the blocks shown in the flowcharts of FIGS. 2, 3, and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein (including the metrics collector 112, the system event logger 113, the he anomaly detector 115, the anomaly portal 118, and computing services 121) that comprises software or code can be embodied in any non-transitory computer-readable medium for use by or in connection with an instruction execution system such as, for example, the processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:
   code that detects a plurality of anomalies in a plurality of time series, individual ones of the time series being derived from metrics observed from a computing system, at least two of the time series differing in time resolution, the individual ones of the time series being at least one of non-stationary or heteroskedastic, the plurality of anomalies being detected by:
      decomposing the individual ones of the time series into a respective smoothed component and a respective noise component;
      identifying any outliers present in the respective noise component;
      identifying any step functions present in the respective smoothed component;
      identifying any changes in variance in a respective one of the time series; and
      identifying any changes in density in the respective one of the time series;
   code that partitions the plurality of anomalies according to a time of occurrence;
   code that identifies co-occurring instances of anomalies in the partitioned anomalies;
   code that correlates at least a portion of the plurality of anomalies with at least one of a plurality of external events affecting the computing system;
   code that assigns a magnitude to the co-occurring instances of anomalies; and
   code that reports the co-occurring instances of anomalies, the assigned magnitude, and the correlated at least one external event.

2. The non-transitory computer-readable medium of claim 1, wherein the code that report further comprises code that generates a visual representation of the co-occurring instances of anomalies, the assigned magnitude, and the correlated at least one external event.

3. A method, comprising:
   detecting, by a computer, at least one anomaly in a time series, the time series derived from a corresponding metric observed in a computing system, the time series being at least one of a non-stationary time series or a heteroskedastic time series, by:
      decomposing the time series into a smoothed component and a noise component;
      identifying any outliers present in the noise component;
      identifying any step functions present in the smoothed component;
      identifying any changes in variance in the time series; and
      identifying any changes in density in the time series;
   correlating the detected at least one anomaly with at least one of a plurality of external events affecting the computing system;
   assigning, by the computer, a magnitude to the detected at least one anomaly; and
   reporting, by the computer, the detected at least one anomaly, the assigned magnitude, and the correlated at least one external event.

4. The method of claim 3, further comprising:
   processing a plurality of collected values of a corresponding metric to produce the time series.

5. The method of claim 3, further comprising identifying co-occurring instances of the detected at least one anomaly.

6. The method of claim 4, wherein identifying any changes in variance further comprises:
   computing, for individual ones of a plurality of points in the noise component, a distance from a respective point to a moving central value of the noise component;
   determining, for the individual ones of the plurality of points in the noise component, whether the distance exceeds a predefined threshold that is based on a moving interquartile range of the respective point; and
   identifying the respective point as a change in variance when the distance exceeds the predefined threshold.

7. The method of claim 6, wherein the moving interquartile range corresponds to a pair of symmetric percentiles.

8. The method of claim 6, further comprising:
   assigning, to the magnitude, a score corresponding to the distance divided by the moving interquartile range.

9. The method of claim 4, wherein the identified outliers, the identified step functions, the identified changes in variance, and the identified changes in density are detected as the at least one anomaly.

10. The method of claim 3, wherein the detecting identifies the at least one anomaly as at least one of a change in mean, a change in variance, an outlier, an instance of missing data, or an instance of unexpected data.

11. The method of claim 3, the decomposing further comprising:
    applying a moving median to the time series to produce the smoothed component, wherein the noise component corresponds to a portion of the time series remaining after the applying of the moving median.

12. The method of claim 11, further comprising generating the noise component as a point wise difference of the time series and the smoothed component.

13. The method of claim 11, further comprising applying a wavelet filter to the moving median to produce the smoothed component.

14. The method of claim 11, wherein the applying the moving median uses a predefined window size that is based at least in part on a sample rate of the time series.

15. The method of claim 11, wherein the time series corresponds to at least one of a non-ergodic time series, a time series containing cyclical effects, or a time series that is missing at least one time point.

16. The method of claim 3, further comprising designating the identified co-occurring instances of the detected at least one anomaly as a group.

17. A system, comprising:
at least one hardware computing device; and
an application implemented in the at least one hardware computing device, the application comprising:
logic that detects a plurality of anomalies in a plurality of time series, individual ones of the time series derived from a plurality of metrics observed from a computing system, comprising:
logic that decomposes one of the time series into a smoothed component and a noise component;
logic that identifies any outliers present in the noise component;
logic that identifies any step functions present in the smoothed component;
logic that identifies any changes in variance in the one of the time series; and
logic that identifies any changes in density in the one of the time series;
logic that correlates at least a portion of the plurality of anomalies with at least one of a plurality of external events affecting the computing system;
logic that assigns a magnitude to the plurality of anomalies; and
logic that reports the plurality of anomalies, the assigned magnitude, and the correlated at least one external event.

18. The system of claim 17, the logic that obtains further comprising computing a period of the individual ones of the time series.

19. The system of claim 17, wherein the logic that detects further comprises logic that detects, as the anomalies, the identified outliers, the identified step functions, the identified changes in variance, and the identified changes in density.

20. The system of claim 17, wherein at least two of the time series differ in time resolution.

21. The system of claim 17, further comprising logic that identifies co-occurring instances of the plurality of anomalies.

22. The system of claim 21, further comprising logic that partitions the plurality of anomalies according to a time of occurrence.

23. The system of claim 21, further comprising logic that designates the co-occurring instances of the plurality of anomalies as a group.

24. The system of claim 23, wherein the logic that assigns further comprises logic that assigns the magnitude to a combination of the co-occurring instances of the plurality of anomalies.

25. The system of claim 17, wherein the logic that identifies any step functions further comprises:
logic that obtains a period of the one of the time series;
logic that partitions the one of the time series into adjacent stripes, individual ones of the adjacent stripes having a respective length equal to the period;
logic that predicts a plurality of next values based at least in part on a normal pattern generated from the partitioned one of the time series and from a current trend generated from the partitioned one of the time series; and
logic that identifies any of a plurality of points in the one of the time series that deviates significantly from the plurality of next values, wherein the any of the plurality of points are identified as one of the step functions.

26. The system of claim 25, wherein the logic that identifies any step functions further comprises logic that processes a current stripe to generate, as the current trend, a time series that includes a predefined number of preceding values in the current stripe, wherein the current stripe corresponds to one of the stripes that is latest in time within the time series.

27. The system of claim 25, wherein the logic that identifies any step functions further comprises:
logic that forms a plurality of periodic subsets by taking a respective one of a plurality of corresponding points from individual ones of a plurality of partitions, individual ones of the corresponding points being separated by the period of the one of the time series;
logic that computes a central value for individual ones of the periodic subsets to produce a plurality of central values, and logic that constructs, as the normal pattern, a time series that includes the plurality of central values.

28. The system of claim 27, wherein the central values correspond to at least one of a median, a mean, or an exponentially weighted mean.

* * * * *